US012790961B2

(12) United States Patent
Gnitzcavich et al.

(10) Patent No.: US 12,790,961 B2
(45) Date of Patent: Nov. 10, 2026

(54) MAINTAINABLE DUAL WALL TUBE ARCHITECTURE FOR HOT BEARING COMPARTMENT

(71) Applicant: RTX Corporation, Farmington, CT (US)

(72) Inventors: Nicholas Daniel Gnitzcavich, Harwinton, CT (US); Jared B. Abshire, Chicago, IL (US); Xuefeng Zhang, Chelmsford, MA (US); Thomas B. Avis, Manchester, CT (US); Sebastian Majewski, Rzeszów (PL); Aleksander Niemiec, Rzeszów (PL); Krzysztof Tutka, Rzeszów (PL)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/192,725

(22) Filed: Apr. 29, 2025

(65) Prior Publication Data

US 2026/0338087 A1 Oct. 29, 2026

(51) Int. Cl.
*F01D 25/16* (2006.01)
*F01D 25/18* (2006.01)

(52) U.S. Cl.
CPC ........... *F01D 25/18* (2013.01); *F01D 25/162* (2013.01); *F05D 2220/32* (2013.01); *F05D 2230/60* (2013.01)

(58) Field of Classification Search
CPC .... F01D 25/18; F01D 25/162; F05D 2220/32; F05D 2230/60
See application file for complete search history.

(56) References Cited

U.S. PATENT DOCUMENTS 4,046,223 A * 9/1977 McHugh ............... F01D 25/125 384/313
6,438,938 B1 8/2002 Burkholder et al.
10,393,302 B2 8/2019 Dill et al.
10,443,440 B2 10/2019 Socha et al.
(Continued)

FOREIGN PATENT DOCUMENTS

CN 117365688 A 1/2024
EP 3348801 A2 7/2018
FR 3147585 A1 10/2024

OTHER PUBLICATIONS

European Search Report for EP Application No. 26175563.1 dated Sep. 9, 2026.

*Primary Examiner* — Nathaniel E Wiehe
*Assistant Examiner* — Theodore C Ribadeneyra
(74) *Attorney, Agent, or Firm* — Carlson, Gaskey & Olds, P.C.

(57) ABSTRACT

An oil supply system includes a bearing compartment receiving at least one bearing to support at least one shaft. The bearing compartment is connected to an oil supply inner wall. The oil supply inner wall is connected to receive oil from an oil pump and deliver oil to the bearing compartment. There is an outer drain chamber radially outward of the oil supply inner wall, and radially inwardly of an outer drain wall. The outer drain chamber is fluidly connected to a location outwardly of the bearing compartment. The oil supply inner wall and the outer drain wall are formed as separate pieces. A method of assembling an oil service tube and a method of servicing an oil service tube are also disclosed.

5 Claims, 4 Drawing Sheets

(56) References Cited

U.S. PATENT DOCUMENTS

| | | | | |
|---|---|---|---|---|
| 10,794,203 | B2 | 10/2020 | Karuppanchetty et al. | |
| 11,519,297 | B2 | 12/2022 | Booth et al. | |
| 11,725,529 | B2 | 8/2023 | Troughton | |
| 2009/0079185 | A1 | 3/2009 | Carbines-Evans et al. | |
| 2013/0189071 | A1* | 7/2013 | Durocher | F02C 7/24<br>415/168.1 |
| 2014/0182972 | A1 | 7/2014 | Hetherington et al. | |
| 2018/0224043 | A1* | 8/2018 | Hendrickson | F01D 25/162 |
| 2020/0072125 | A1* | 3/2020 | McKenney | F02C 7/06 |

* cited by examiner

MAINTAINABLE DUAL WALL TUBE ARCHITECTURE FOR HOT BEARING COMPARTMENT

BACKGROUND

This application relates to a dual wall oil service tube which is more easily maintained than existing oil service tubes.

Gas turbine engines are known, and typically include a propulsor delivering air into a compressor and as propulsion air. Air is compressed in the compressor and delivered into a combustor where it is mixed with fuel and ignited. Products of this combustion pass downstream over turbine rotors, driving them to rotate.

There are a number of rotating shafts in a typical gas turbine engine supported by bearings. Lubricant must be supplied to the bearings and in a bearing compartment. An oil service tube has an inner wall for receiving oil from an oil pump to deliver the oil into the bearing compartment. An outer wall is spaced from the inner wall and provides a drain tube such that if the inner wall fails the oil will be drained away from the bearing compartment, and outwardly of the engine.

Typically, the outer wall and the inner wall have been formed as a one piece item. This raises challenges when one needs to remove the inner wall for maintenance.

The outer wall is secured to the bearing compartment. The inner wall must sometimes be replaced. Removing the combined outer wall and inner wall requires a good deal of disassembly.

SUMMARY

In a featured embodiment, an oil supply system includes a bearing compartment receiving at least one bearing to support at least one shaft. The bearing compartment is connected to an oil supply inner wall. The oil supply inner wall is connected to receive oil from an oil pump and deliver oil to the bearing compartment. There is an outer drain chamber radially outward of the oil supply inner wall, and radially inwardly of an outer drain wall. The outer drain chamber is fluidly connected to a location outwardly of the bearing compartment. The oil supply inner wall and the outer drain wall are formed as separate pieces.

In another embodiment according to the previous embodiment, the oil supply inner wall is fixed to a bearing compartment housing.

In another embodiment according to any of the previous embodiments, the oil supply inner wall is threaded into the bearing compartment housing.

In another embodiment according to any of the previous embodiments, the bearing compartment is in a turbine section of a gas turbine engine.

In another embodiment according to any of the previous embodiments, the bearing compartment is in a gas turbine engine.

In another embodiment according to any of the previous embodiments, the bearing compartment is in a turbine section.

In another embodiment according to any of the previous embodiments, the bearing compartment is in a mid-turbine frame.

In another embodiment according to any of the previous embodiments, a scavenge tube communicates oil back to the oil pump from the bearing compartment.

In another featured embodiment, a method of assembling an oil service tube includes providing a bearing compartment receiving at least one bearing to support at least one shaft. The bearing compartment is connected to an oil supply inner wall. The oil supply inner wall is connected to receive oil from an oil pump and deliver oil to the bearing compartment. There is an outer drain chamber radially outward of the oil supply inner wall, and radially inward of an outer drain wall. The outer drain wall fluidly connected to a location outwardly of the bearing compartment. The oil supply tube and the outer drain wall are formed of separate pieces. The method of assembly includes initially installing the outer drain wall from inside an outer case, then attaching the outer drain wall to a bearing compartment housing, then moving the oil supply inner wall into the outer drain wall.

In another embodiment according to any of the previous embodiments, further includes the step of attaching the oil supply inner wall to the bearing compartment housing.

In another embodiment according to any of the previous embodiments, the oil supply inner wall is attached to the bearing compartment case by a threaded connection.

In another embodiment according to any of the previous embodiments, the bearing compartment is in a turbine section of a gas turbine engine.

In another embodiment according to any of the previous embodiments, the bearing compartment is in a gas turbine engine.

In another embodiment according to any of the previous embodiments, the bearing compartment is in a turbine section.

In another featured embodiment, a method of servicing an oil service tube includes providing a bearing compartment receiving at least one bearing to support at least one shaft. The bearing compartment is connected to an old oil supply inner wall. The old oil supply inner wall is connected to receive oil from an oil pump and deliver oil to the bearing compartment. There is an outer drain chamber radially outward of the old oil supply inner wall, and radially inward of an outer drain wall. The outer drain wall is fluidly connected to a location outwardly of the bearing compartment. The old oil supply inner wall and the outer drain wall are formed of separate pieces the old oil supply inner wall attached to the bearing compartment. The old oil supply inner wall is removed while leaving the outer drain wall attached to the bearing compartment housing.

In another embodiment according to any of the previous embodiments, further includes the step of then attaching a new oil supply inner wall to the bearing compartment housing.

In another embodiment according to any of the previous embodiments, the old oil supply inner wall and the new oil supply inner wall are attached to the bearing compartment case by a threaded connection.

In another embodiment according to any of the previous embodiments, the bearing compartment is in a turbine section of a gas turbine engine.

In another embodiment according to any of the previous embodiments, the bearing compartment is in a gas turbine engine.

In another embodiment according to any of the previous embodiments, the bearing compartment is in a turbine section.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
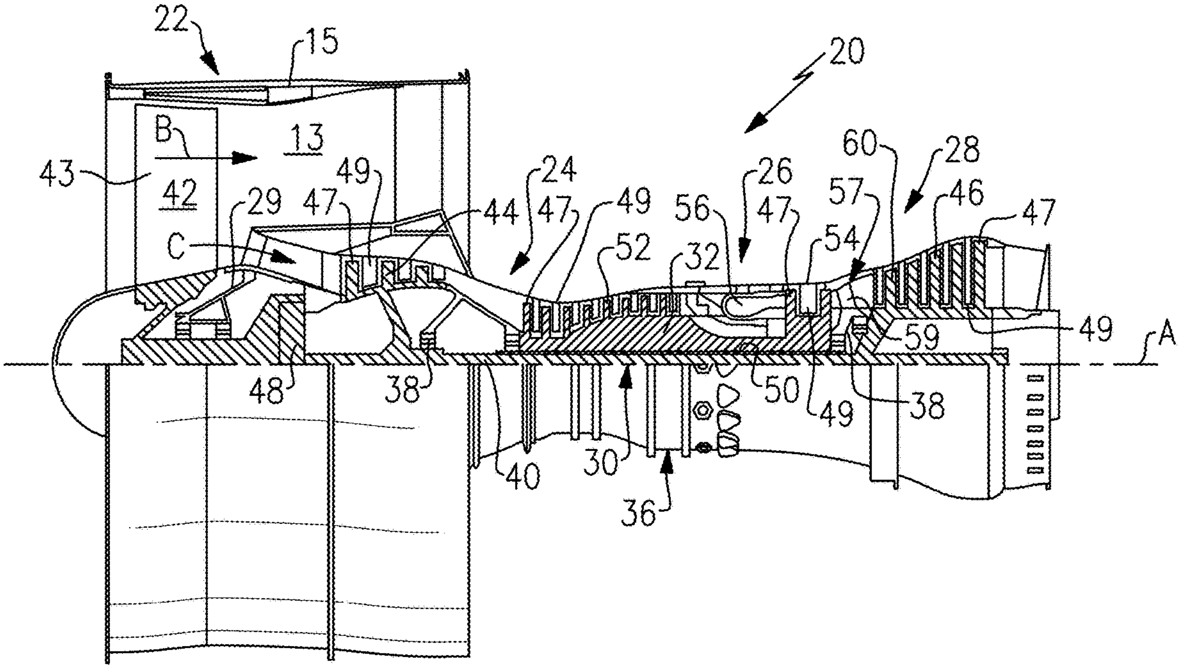
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram}\ ^\circ \text{R})/(518.7^\circ\ \text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
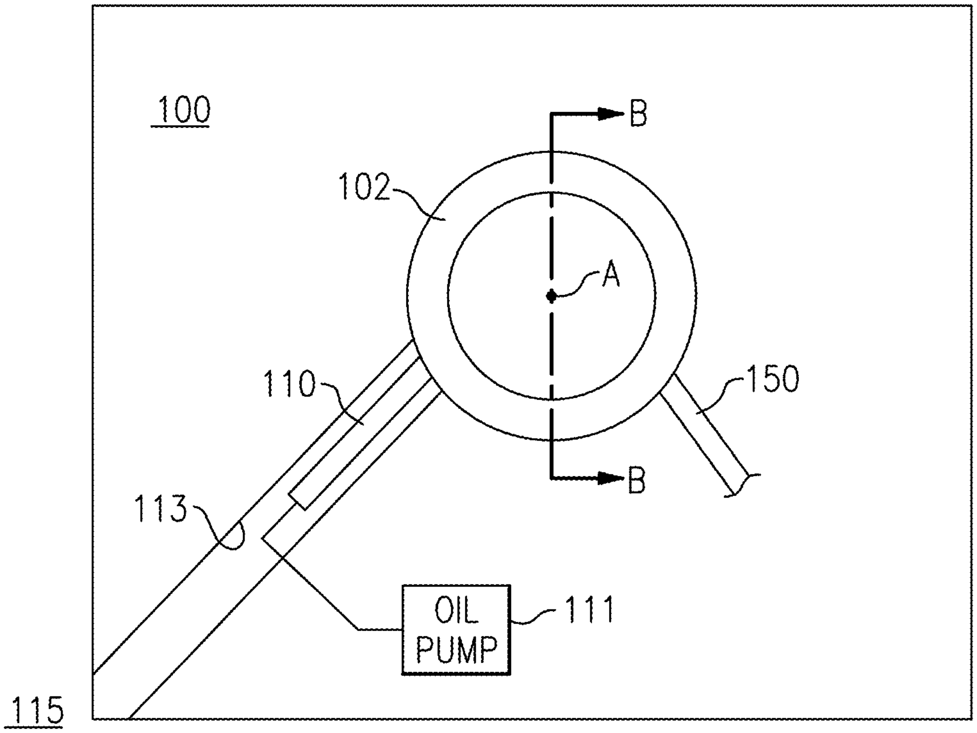
FIG. 2A shows a bearing compartment with an oil supply tube and a scavenge line.

FIG. 2A shows a bearing housing 102 that may be in a mid-turbine frame such as mid-turbine frame 57 as shown in FIG. 1. Oil is supplied into housing 102 from supply line 110. An oil pump 111 is shown schematically delivering oil into the oil supply tube 110. A scavenge line 150 is also shown for scavenging lubricant from an interior bearing compartment and returning it to the oil pump. As shown, lines 110 and 150 are at a vertically lower location.

As shown, the oil supply tube 110 is received within a drain tube 113. As mentioned above, should the inner tube fail, the oil will drain away through tube 113 to location 115 that is outside of an engine 100.

Figure 2B:
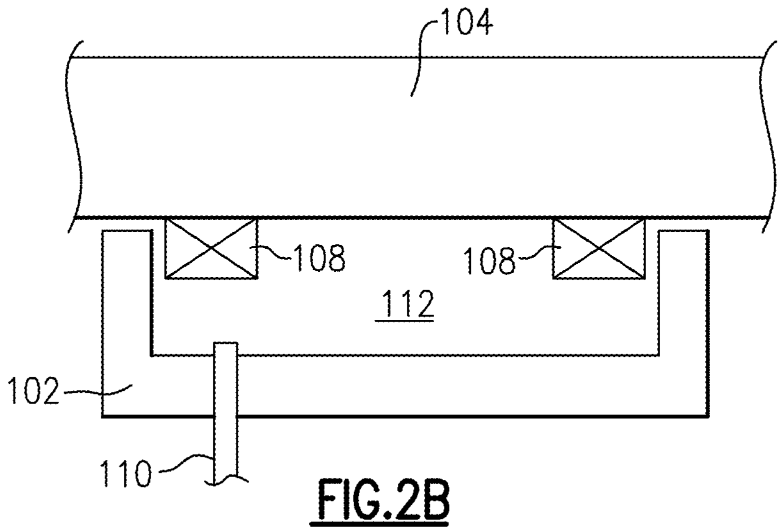
FIG. 2B schematically shows a bearing compartment.

Bearing housing 102 is shown in FIG. 2B. Bearings 108 support rotation of a shaft 104. An oil supply tube 110 is shown schematically for delivering oil into a bearing compartment 112 receiving the bearings 108.

Figure 3:
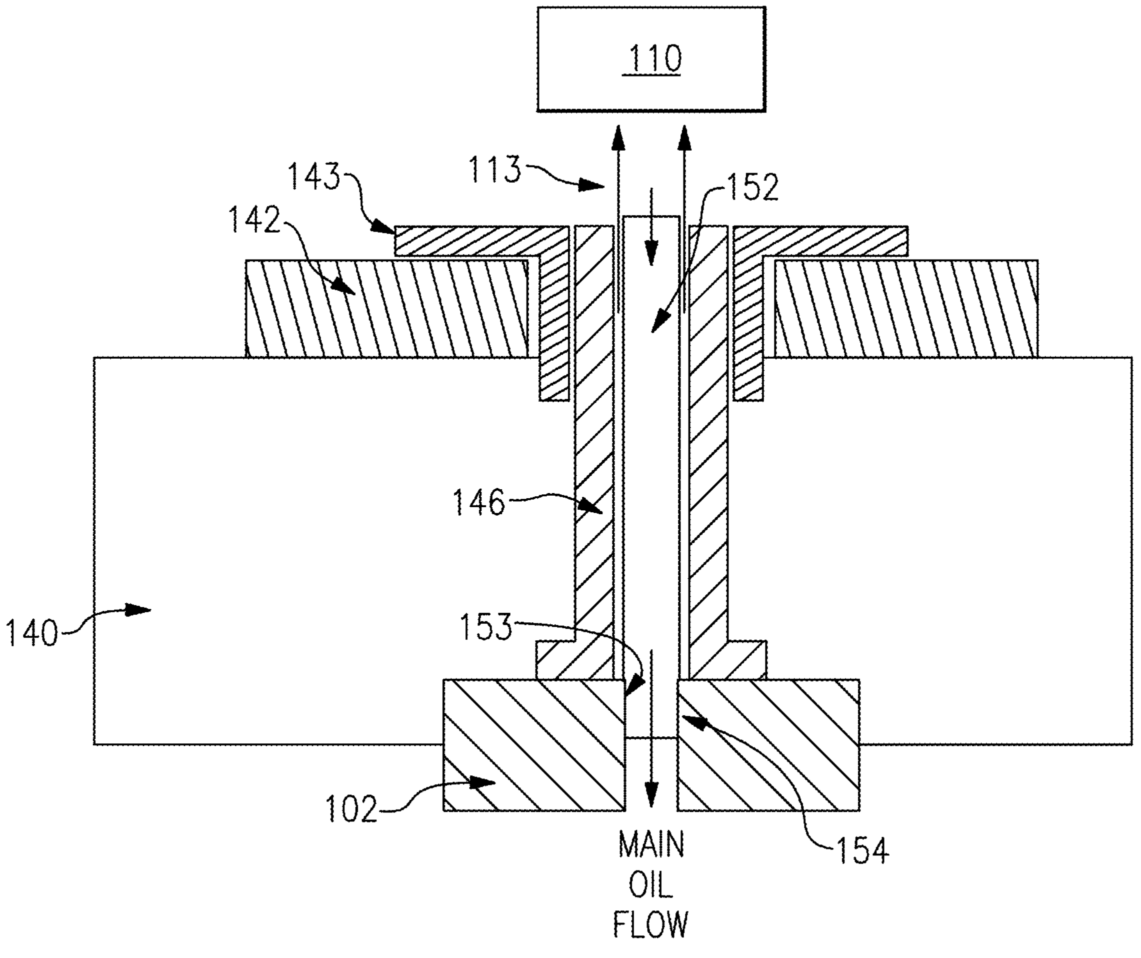
FIG. 3 shows a unique dual wall oil service tube.

FIG. 3 shows a unique dual wall structure 140.

Outer wall 146 is formed separately from inner wall 152. The outer wall 146 interfaces with an outer module case 142 using flange 143. Radial movement is possible to allow for outward thermal growth. The outer wall 146 is further fixed to the bearing compartment housing 102. The inner wall 152 is threaded at 153 into the bearing compartment housing 102. As is clear from FIG. 3, the drain chamber defined between the outer wall 146 and inner wall 152 ends at bearing compartment housing 102. The inner wall being threaded at 153 into the bearing compartment housing 102 blocks the drainage chamber from reaching into the bearing compartment housing. Thus, both the outer wall 146 and inner wall 152 are secured to the same bearing compartment housing 102.

Connection 113 could be said to be an outer drain chamber radially outward of the oil supply inner wall 152, and radially inwardly of an outer drain wall 146. The outer drain chamber is fluidly connected to a location 115 outwardly of the gas turbine engine.

In the prior art dual wall oil service tubes, the inner wall and the outer wall were formed as one piece. This has made maintenance, replacement or repair of the inner wall challenging.

Figure 4A:
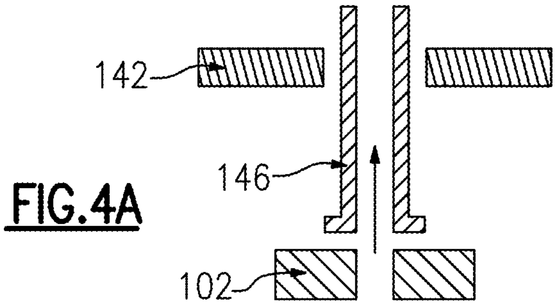
FIG. 4A shows a first step in assembling the FIG. 3 oil service tube.

FIG. 4A shows a first step in assembling the oil service tube 140. Initially, outer wall 146 is installed from inside and shifted up to the outer module case 142. Then, the bearing compartment housing 102 is brought in, next the outer wall 146 is shifted to bearing compartment housing 102 and fixed.

Figure 4B:
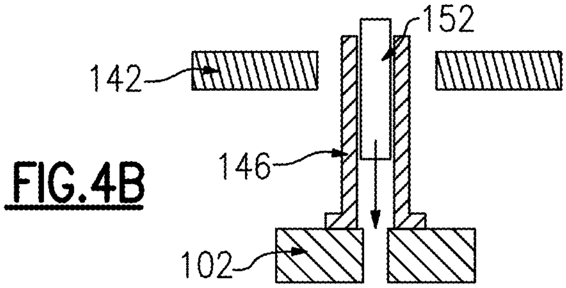
FIG. 4B shows a subsequent step.

As shown in FIG. 4B, the inner wall 152 is then brought inwardly, and to be threaded at 154 into the bearing compartment housing 102.

Figure 4C:
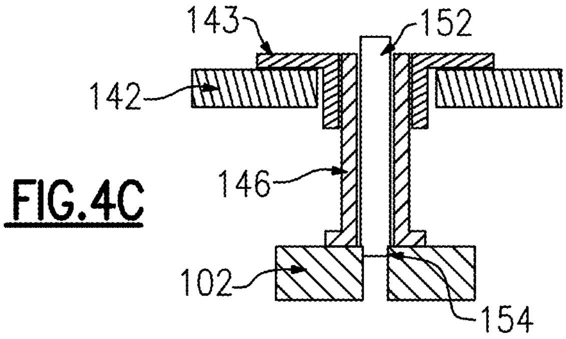
FIG. 4C shows the secured oil service tube.

FIG. 4C shows the oil supply inner wall 152 secured to the bearing compartment housing 102 and outer wall 146 secured to an outer module case 142 using flange 143. At times the oil service inner wall 152 must be removed for replacement. With the present disclosure, the oil supply inner wall 152 may be unthreaded, and replaced with a new oil supply inner wall such as shown in FIG. 4B.

Figure 4D:
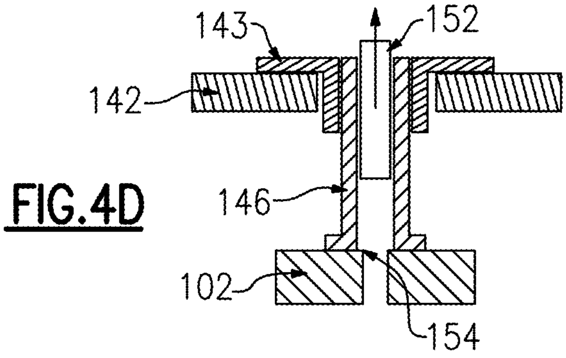
FIG. 4D shows the ease of removing an inner wall for maintenance with the disclosed dual wall structure.

With this embodiment, when it becomes desirable to replace or repair the inner tube 152, it can be simply unthreaded from a location outwardly of the outer module case 142 and removed as shown in FIG. 4D, then a new inner wall 152 is threaded in as shown in FIG. 4B.

An oil supply system under this disclosure could be said to include a bearing compartment that receives bearings to support the shaft. The bearing compartment is connected to an oil supply inner wall. The oil supply inner wall is connected to receive oil from an oil pump and deliver oil to the bearing compartment. There is an outer drain chamber radially outward of the oil supply inner wall, and radially inwardly of an outer drain wall. The drain chamber is fluidly connected to a location outwardly of the bearing compartment, and the oil supply inner wall and the outer drain wall are formed as separate pieces.

A method of assembling an oil service tube under this disclosure could be said to include providing a bearing compartment receiving at least one bearing to support at least one shaft. The bearing compartment is connected to an oil supply inner wall. The oil supply inner wall is connected to receive oil from an oil pump and deliver oil to the bearing compartment. There is an outer drain chamber radially outward of the oil supply inner wall, and radially inward of an outer drain wall. The drain wall is fluidly connected to a location outwardly of the bearing compartment, and the oil supply inner wall and the outer drain wall are formed of separate pieces. The method of assembly includes initially installing the outer drain wall from inside an outer case, then attaching the outer drain wall to a bearing compartment housing, then moving the oil supply inner wall into the outer drain wall.

A method of servicing an oil service tube under this disclosure could be said to include providing a bearing compartment receiving at least one bearing to support at least one shaft. The bearing compartment is connected to an old oil supply inner wall. The old oil supply inner wall is connected to receive oil from an oil pump and deliver oil to the bearing compartment. There is an outer drain chamber radially outward of the old oil supply inner wall, and radially inward of an outer drain wall. The drain wall is fluidly connected to a location outwardly of the bearing compartment, and the old oil supply inner wall and the outer drain wall are formed of separate pieces. Removing the old oil supply inner wall while leaving the outer drain wall attached to the bearing compartment housing and the outer module case.

Although embodiments have been disclosed, a worker of ordinary skill in this art would recognize that modifications would come within the scope of this disclosure. As one example, while the propulsor is disclosed as a fan it could also be an open rotor. For that reason, the following claims should be studied to determine the true scope and content of this disclosure.

What is claimed is:

1. An oil supply system comprising:

a bearing compartment receiving at least one bearing to support at least one shaft, said bearing compartment connected to an oil supply inner wall, said oil supply inner wall connected to receive oil from an oil pump and deliver oil to the bearing compartment, and there being an outer drain chamber radially outward of the oil supply inner wall, and radially inwardly of an outer drain wall, the outer drain chamber fluidly connected to a location outwardly of a gas turbine engine that receives the compartment, and wherein the oil supply inner wall and the outer drain wall are formed as separate pieces;

wherein the oil supply inner wall is fixed to a bearing compartment housing, and said outer drain wall further being secured to the bearing compartment housing;

wherein the oil supply inner wall is threaded into the bearing compartment housing; and wherein the attachment of the oil supply inner wall to the bearing compartment housing closes off the outer drain chamber from reaching into the bearing compartment.

2. The system as set forth in claim 1, wherein the bearing compartment is in a turbine section of a gas turbine engine.

3. The system as set forth in claim 1, wherein the bearing compartment is in a gas turbine engine.

4. The system as set forth in claim 1, wherein the bearing compartment is in a mid-turbine frame.

5. The system as set forth in claim 1, wherein a scavenge tube communicates oil back to the oil pump from the bearing compartment.

* * * * *